United States Patent [19]
Cordova et al.

[11] Patent Number: 5,949,930
[45] Date of Patent: Sep. 7, 1999

[54] APPARATUS AND METHOD FOR SCALE FACTOR STABILIZATION IN INTERFEROMETRIC FIBER OPTIC ROTATION SENSORS

[75] Inventors: Amado Cordova, West Hills; Eric Lee Goldner, Valencia, both of Calif.; James R. Steele, Jackson, Wyo.

[73] Assignee: Litton Systems, Inc., Woodland Hills, Calif.

[21] Appl. No.: 08/899,223

[22] Filed: Jul. 23, 1997

[51] Int. Cl.[6] ..................................................... G02B 5/30
[52] U.S. Cl. .................................. 385/27; 356/350; 372/6
[58] Field of Search ......................... 385/27–29; 356/350; 372/6

[56] References Cited

U.S. PATENT DOCUMENTS

| | | | |
|---|---|---|---|
| 4,556,279 | 12/1985 | Shaw et al. | 385/30 |
| 4,671,658 | 6/1987 | Shaw et al. | 356/350 |
| 4,997,282 | 3/1991 | Pavlath | 356/350 |
| 5,037,205 | 8/1991 | Pavlath | 356/350 |
| 5,046,808 | 9/1991 | Chang | 385/13 |
| 5,108,183 | 4/1992 | Fling et al. | 356/350 |
| 5,231,465 | 7/1993 | Huang et al. | 356/350 |
| 5,260,768 | 11/1993 | Cordova et al. | 356/350 |
| 5,335,064 | 8/1994 | Nishiura et al. | 356/350 |
| 5,486,916 | 1/1996 | Michal et al. | 356/345 |

*Primary Examiner*—Rodney Bovernick
*Assistant Examiner*—Ellen E. Kang
*Attorney, Agent, or Firm*—Lynn & Lynn

[57] ABSTRACT

A fiber optic rotation sensor system having improved scale factor stability includes an optically pumped gain fiber arranged to provide optical signals to an integrated optics chip connected to a fiber optic sensing coil. An optical coupler receives optical signals from the gain fiber and provides the optical signals to an optical fiber. The optical fiber is arranged to guide optical signals from the optical coupler along an optical path toward the integrated optics chip such that optical signals from the gain fiber are input to the fiber optic sensing coil to form counter-propagating waves therein. The counter-propagating waves traverse the sensing coil and then combine in the integrated optics chip to form a gyro output signal. A depolarizer is placed in the optical path between the first optical coupler and the integrated optics chip to prevent random changes in the state of polarization of optical signals propagating between the gain fiber and the integrated optic chip.

16 Claims, 2 Drawing Sheets

APPARATUS AND METHOD FOR SCALE FACTOR STABILIZATION IN INTERFEROMETRIC FIBER OPTIC ROTATION SENSORS

BACKGROUND OF THE INVENTION

This invention relates generally to techniques for providing a stable scale factor in a fiber optic rotation sensor having a light source that provides counter-propagating waves to a fiber optic sensing coil. This invention relates particularly to techniques for stabilizing the scale factor in a fiber optic rotation sensor by stabilizing both the polarization of the optical signal from the light source to the interferometer and the polarization of optical signals fed back from the interferometer to the light source.

A fiber optic rotation sensor includes an optical signal source that provides counter-propagating waves to an interferometer that includes a fiber optic sensing coil. A typical optical signal source includes a laser diode that provides pump light to a gain fiber. The gain fiber includes a dopant that absorbs pump light and then emits an optical signal that is suitable for delivery to the interferometer. Within the interferometer an integrated optics chip is connected to the fiber optic sensing coil. A typical integrated optics chip in a fiber optic rotation sensor includes components such as polarizers, phase modulators and a Y-coupler that are used in processing and controlling optical signals input to and from the fiber optic sensing coil. The output of the interferometer is the phase difference between the two counter-propagating waves. The rotation rate of the coil about its sensing axis is obtained by dividing this phase difference by a scale factor. The scale factor of a fiber optic gyroscope (or Sagnac scale factor, SSF) is given by the well-known equation:

$$SSF = \frac{2\pi LD}{c\lambda}$$

where L is the length of the sensing loop (including the coil length plus the length of the integrated optic waveguides after the Y-coupler or Y-junction, D is the effective coil diameter, c is the speed of light in vacuum and $\lambda$ is the "average" or "interferometric" mean wavelength. Making accurate measurements with a fiber optic rotation sensor requires an accurate and stable scale factor.

The scale factor stability of fiber optic gyros is affected by changes in the polarization state of the light in the fiber between the optical source and the integrated optics chip. Changes in stress within the fiber will cause the polarization sate of light guided by the fiber to change. This stress may be mechanical or thermal in origin. Any change in polarization state changes the scale factor of the fiber optic rotation sensor via optical filtering of the light when the traversing first the section between the source and the integrated optics chip (made partly of the single mode fiber and partly of polarization maintaining fiber) then traversing the polarizing integrated optics chip itself. This optical filtering can lead to short term scale factor instability and long term degradation of the scale factor repeatability.

SUMMARY OF THE INVENTION

The present invention provides a fiber optic rotation sensor system that has improved scale factor stability. The present invention is directed to apparatus for reducing changes in the polarization state of light between the optical source and the interferometer within a fiber optic rotation sensor. The present invention comprises an optical source including a laser diode pump source and a doped gain fiber for conversion of the highly coherent pump light to a broad spectral output. A wavelength division multiplexer (WDM) is used for efficient coupling of pump light from the laser diode to the doped fiber and for efficient coupling of broadband light from the doped fiber to the optical coupler. The optical coupler is arranged to receive this optical signal and to provide the optical signal to a first optical fiber. The first optical fiber is arranged to guide the optical signal from the optical coupler along an optical path toward the integrated optics chip such that the optical signal from the gain fiber is input to the fiber optic sensing coil to form counter-propagating waves therein. The counter-propagating waves traverse the sensing coil and then combine in the integrated optics chip to form a gyro output signal. A depolarizer is placed in the optical path between the optical coupler and the integrated optics chip for depolarizing the optical source signal to prevent changes in its polarization state as it propagates to the interferometer. Without the depolarizer, random environmental perturbations may degrade the scale factor stability via the mechanism of polarization wavelength filtering or either the forward light (source to interferometer) or the backward light (interferometer to source).

In one embodiment of the invention, the depolarizer comprises a Lyot depolarizer placed in the first optical fiber.

The fiber optic rotation sensor system may further include an optical isolator in the first optical fiber arranged between the Lyot depolarizer and the optical coupler, the optical isolator being formed to allow propagation of light in the first optical fiber from the first optical coupler to the integrated optics chip and to prevent light from propagating from the integrated optics chip to the gain fiber.

An appreciation of the objectives of the present invention and a more complete understanding of its structure and method of operation may be had by studying the following description of the invention and by referring to the accompanying drawings.

DESCRIPTION OF THE PREFERRED EMBODIMENT

Figure 1:
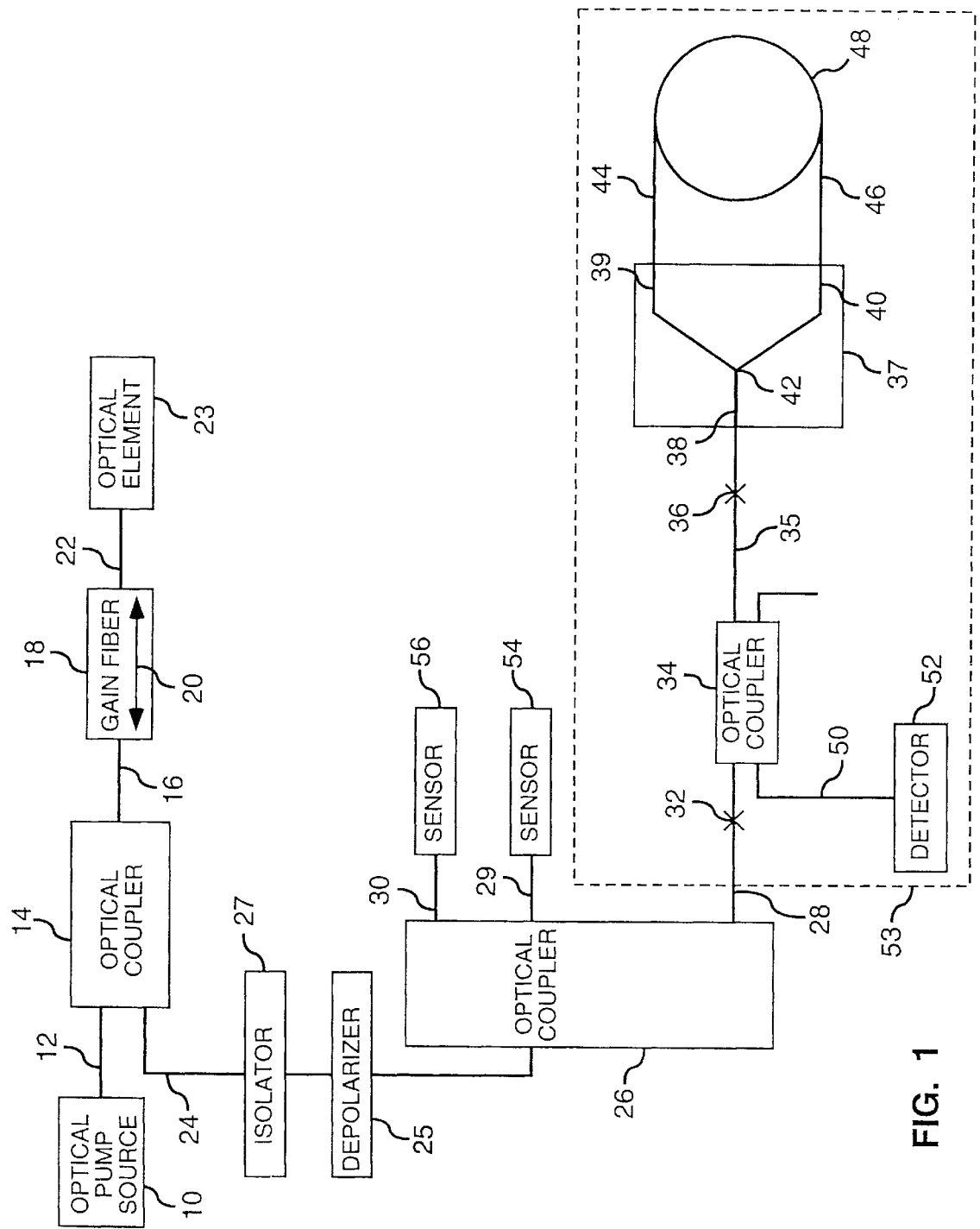
FIG. 1 schematically illustrates a multiple axis embodiment of a fiber optic rotation sensor formed in accordance with the present invention.

FIG. 1 schematically illustrates a fiber optic rotation sensor that embodies the principles of the present invention. Light output from an optical pump source 10 is input to an optical fiber 12 that guides the pump light to an optical coupler 14. The optical pump source 10 is preferably a laser diode that emits a wavelength of either 1475 nm or 980 nm. The optical coupler 14 preferably is a wavelength division multiplexing (WDM) coupler. Coupling devices suitable for use as the optical coupler 14 are disclosed in U.S. Pat. No. 4,556,279 (Shaw et al.), the disclosure of which is hereby incorporated by reference into this disclosure.

The pump light is output from the coupler 14 to an optical fiber 16 which guides the source light to a gain fiber 18. The coupler 14 preferably is formed to couple about 99% of the pump light into the fiber 16. The gain fiber 18 is preferably an erbium-doped fiber. Optical gain fibers are disclosed in U.S. Pat. Nos. 5,231,465 (Huang et al.) and 5,108,183 (Fling et al.), the disclosures of which are hereby incorporated by reference into this disclosure.

The gain fiber 18 absorbs the pump light, which excites the erbium dopant so that it then emits light having a wavelength of about 1560 nm. The emitted light is sufficiently broad band so that is suitable for input to the sensing coil of the fiber optic rotation sensor. The 1560 nm wavelength light is emitted bi-directionally in the gain fiber 18. The double-headed arrow 20 indicates the emitted 1560 nm light that is guided by the gain fiber 18. The light emitted in the direction opposite to the incident pump light is incident upon the wavelength division multiplexing coupler 14 from the right as shown in FIG. 1. The unabsorbed pump light and the emitted 1560 nm light that propagates in the same direction as the pump light then propagate in a fiber 22 to an optical element 23. Together, the pump source 10, optical fiber 12, optical coupler 14, optical fiber 16, gain fiber 18, optical fiber 22 and optical element 23 comprise the optical signal source for the fiber optic rotation sensor.

In one embodiment of the invention, the optical element 23 is arranged to transmit the light incident thereon with minimum reflection so that it radiates out of the fiber 22. Such an element can be an angle-polished capillary tube, a crushed fiber end or other suitable means for preventing the 1560 nm wavelength light and the unabsorbed pump light from being reflected back to the optical fiber 22. In another embodiment of the invention the reflector 23 reflects the emitted 1560 nm wavelength light incident thereon back and thus directs this once-amplified light back through the gain fiber 18. This increases the intensity of the 1560 nm wavelength light that is input to the wavelength division multiplexing coupler 14. The optical element may be a reflector that typically comprises a dichroic mirror to prevent the unabsorbed pump light from being reflected back. The first embodiment of the invention is referred to as "single-pass Erbium-doped fiber source" whereas the second embodiment is referred to as "double-pass Erbium-doped fiber source."

In both embodiments the 1560 nm wavelength optical signal then passes through the coupler 14, which couples approximately 99% of the 1560 nm wavelength light into an optical fiber 24. The fiber optic rotation sensor includes means for depolarizing optical signals propagating between the gain fiber 18 and an integrated optics chip 37. The means for depolarizing optical signals propagating between the gain fiber 18 and the integrated optics chip 37 may include a Lyot depolarizer 25 placed in the fiber 24. Suitable structures for the depolarizer 25 are well-known in the art. The depolarizer 25 preferably is located as shown in FIG. 1. However, in each embodiment, the depolarizer 25 may be placed at the locations 32 or 36.

An optical isolator 27 may be placed in the optical fiber 24 either before or after the depolarizer 25. The isolator 27 is arranged to allow propagation of light in the optical fiber 24 from the optical coupler 14 to the optical coupler 26 and to block light from propagating in the reverse direction in the optical fiber 24 from the optical coupler 26 to the optical coupler 14. A third embodiment of the invention is realized with the use of the isolator 27 with the single-pass Erbium-doped fiber source described above. A fourth embodiment of the invention is realized with the use of the isolator 27 with the double-pass Erbium-doped fiber source.

Light that propagates through the fiber 24 may be input to an optical coupler 26. The optical coupler 26 is unnecessary for a single-axis rotation sensor and may be omitted. However, the optical coupler 26 provides the capability of operating a two-axis or three-axis fiber optic rotation sensor system with a single light source. As shown in FIG. 1, the optical coupler 26 provides signal outputs to a plurality of optical fibers 28–30 so that the invention may be embodied as a one, two or three axis device. For simplicity only the structure of a single axis fiber optic rotation sensor 53 is shown in detail.

The sensor 53 may include a Lyot depolarizer placed at location 32 in the optical fiber 28. The optical fiber 28 guides the optical signal to a multiplexing optical coupler (MUX) 34, which in its simplest form may comprise an evanescent field four-port optical coupler of a type well-known in the art. The coupling ratio of the MUX 34 is ordinarily about 50%. Such couplers are disclosed in the previously referenced U.S. patent to Shaw et al.

The MUX 34 provides an optical output to an optical fiber 35. The fiber optic rotation sensor may include a Lyot depolarizer 36 in the optical fiber 35. The optical fiber 35 guides the light output from the Lyot depolarizer 36 to a multi-function integrated optics chip 37. The multi-function integrated optics chip 37 includes three optical waveguides 38–40 that intersect to form a Y-coupler 42. Suitable structures for the integrated optics chip 37, including the optical waveguides 38–40 and the Y-coupler 42 are disclosed in U.S. Pat. Nos. 5,037,205 (Pavlath) and 5,046,808 (Chang et al.), the disclosures of which are hereby incorporated by reference into this disclosure. The optical waveguide 38 receives light from the optical fiber 35 and guides it to the Y-coupler 42, which then divides the input light between the optical waveguides 39 and 40.

The optical waveguides 39 and 40 provide optical signals to an fiber optic sensing coil 48 via fiber pigtails 44 and 46. The sensing coil 48 preferably is formed of single mode optical fiber as disclosed in U.S. Pat. No. 4,997,282 (Pavlath), the disclosure of which is hereby incorporated by reference into this disclosure. This coil can also be made of polarization maintaining fiber as disclosed in U.S. Pat. No. 5,260,768 (Cordova et al.), which is hereby incorporated by reference into this disclosure.

Light input to the sensing coil 48 via the fiber pigtail 44 forms a clockwise light wave in the sensing coil 48. Similarly, the light input to the sensing coil 48 from the fiber pigtail 46 forms a counterclockwise wave in the sensing coil 48. The clockwise and counterclockwise light waves form an interference pattern in the sensing coil 48. After passing through the sensing coil 48, the clockwise and counterclockwise waves then combine in the Y-coupler 42 to produce the optical signal output of the sensing coil 48. The combined waves produce an interference pattern that indicates the amount of phase shift between the clockwise and counterclockwise waves. The amount of the phase shift thus indicates the rotation rate.

After passing through the optical waveguide 38 and the Lyot depolarizer 36, the combined waves then propagate in the optical fiber 35 to the MUX 34. The MUX 34 then couples half of the optical signal output from the integrated optics chip 37 into an optical fiber 50. The optical fiber 50 then guides the optical signal to a detector 52, which converts the optical signal output of the sensing coil 48 into electrical signals that may be processed to determine the rotation rate.

In prior art fiber optic gyros, that is, gyros that do not have the depolarizer 25, scale factor instabilities are caused by two processes that both involve polarization wavelength filtering. In the first, or forward process, the polarization state of the light going from the optical coupler 14 to the integrated optics chip 37 is modified by stresses (twisting, bending, temperature changes etc.) in any of the single-mode fiber elements 16, 24, 26, 28, 34 and/or 35. This modification of the polarization state of the light followed by polarization filtering in the integrated optics chip 37 results in a mean wavelength error (or scale factor error) because these changes in polarization state are environmentally sensitive in that they change with temperature and other environmental parameters. Inserting the depolarizer 25 stabilizes the polarization state of the light, which therefore eliminates the scale factor error.

The second, or backward process can be explained as follows. Light that returns to the gain fiber 18 from the integrated optics chip 37 is amplified and scattered in the gain fiber 18. Some of the scattered light then is incident upon the WDM coupler 14, which then starts a feedback process in which light that has already passed through the sensing coil 48 is directed back to the sensing coil 48. In prior art fiber optic rotation sensors, the optical feedback returns to the interferometer with an arbitrary polarization state. The polarization varies with stress (due to twisting, bending, temperature change, etc.) applied to the single mode fibers in the optical path to the sensing coil 48. This signal is further acted upon, again by the phase modulators in the integrated optics chip 37. The instability in the scale factor arises from the dual gyro effect created by this feedback light together with the main optical signal.

The principles of the invention may be applied to a multi-axis fiber optic rotation sensor system that includes sensors 54 and 56 connected to the outputs 29 and 30, respectively, of the optical coupler 26. The sensors 54 and 56 may be formed to be identical to the apparatus 53 connected to the optical fiber 28. In a multi-axis fiber optic rotation sensor system depolarizers (not shown) corresponding to one of the depolarizers 32 and 36 may be included in the sensor for each axis.

As previously explained, including the Lyot depolarizer 25 in a single-axis gyro serves two purposes: first it stabilizes the polarization of the forward light (from source to interferometer) and second, it also stabilizes the polarization of the backward light (from interferometer to source). Because of the depolarizer 25, light polarization is much less sensitive to environmental perturbations acting on the single mode fiber sections of the gyro.

Furthermore, in a two-axis or three-axis system, the depolarizer 25 stabilizes the light polarization of one sensing coil's output going back to the light source that is fed back (via the scattering process previously described) to the other coil (or coils).

Figure 2:
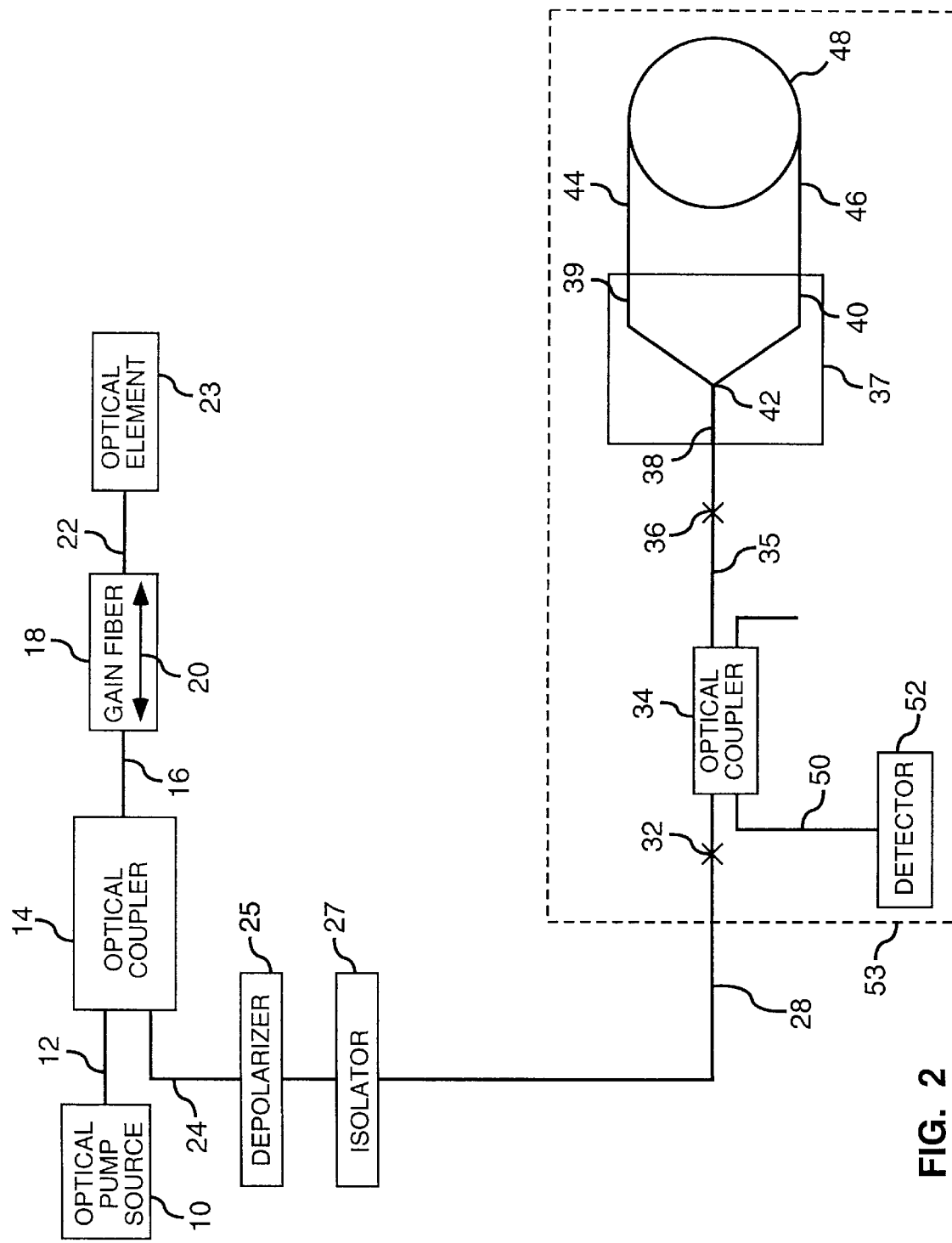
FIG. 2 schematically illustrates a single axis embodiment of a fiber optic rotation sensor formed in accordance with the present invention.

FIG. 2 illustrates a single axis fiber optic rotation sensor according to the present invention. FIGS. 1 and 2 are essentially identical except that FIG. 2 omits the optical coupler 26, the fibers 29 and 30 and the sensors 54 and 56. FIG. 2 also differs from FIG. 1 in that the positions of the isolator 27 and the depolarizer 25 are reversed. Reversal of the isolator 27 and depolarizer 25 is not required for the single axis fiber optic rotation sensor. The two alternate positions of the depolarizer 25 and isolator 27 in FIGS. 1 and 2 are illustrated to show that the positions of these two devices may be interchanged.

In the single axis fiber optic rotation sensor, the Lyot depolarizer 32 between the optical coupler 26 and the multiplexer 34 and the Lyot depolarizer 36 between the multiplexer 34 and the integrated optics chip 37 can be used instead of the Lyot depolarizer 25. A two-axis or three-axis system preferably includes the depolarizer 25.

In an embodiment that includes the isolator 27, the depolarizer is still needed to stabilize the polarization of the forward light. In this case there is no need to stabilize the polarization of the backward light since that light is suppressed by the isolator 27.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing descriptions define the scope of the invention. All modifications to the embodiments described herein that come within the meaning and range of equivalence of the claims are embraced within the scope of the invention.

What is claimed is:

1. A fiber optic rotation sensor system that includes an optically pumped gain fiber arranged to provide optical signals to an integrated optics chip connected to a fiber optic sensing coil, comprising:

a first optical coupler arranged to receive optical signals from the gain fiber;

a first optical fiber arranged to guide optical signals from the first optical coupler along an optical path toward the integrated optics chip such that optical signals from the gain fiber are input to the fiber optic sensing coil to form counter-propagating waves therein, the counter-propagating waves traversing the sensing coil and then combining in the integrated optics chip to form a gyro output signal; and a depolarizer arranged for depolarizing the optical signals propagating between the gain fiber and the integrated optics chip to prevent random changes in their polarization state.

2. The fiber optic rotation sensor system of claim 1 wherein the depolarizer comprises a Lyot depolarizer in the first optical fiber.

3. The fiber optic rotation sensor system of claim 2, further including an optical isolator in the first optical fiber arranged before the Lyot depolarizer, the optical isolator being formed to allow propagation of light from the gain fiber to the integrated optics chip and to prevent light from propagating from the integrated optics chip to the gain fiber.

4. The fiber optic rotation sensor system of claim 2, further including an optical isolator in the first optical fiber arranged after the Lyot depolarizer, the optical isolator being formed to allow propagation of light from the gain fiber to the integrated optics chip and to prevent light from propagating from the integrated optics chip to the gain fiber.

5. The fiber optic rotation sensor system of claim 1, further including:

a second optical coupler connected to the first optical fiber to receive optical signals therefrom;

a plurality of sensors arranged to receive optical signals from the second optical coupler, each sensor including:
a second optical fiber connected to the second optical coupler; and
a fiber optic multiplexer arranged to receive optical signals from the second optical fiber; and a third optical fiber arranged to guide optical signals from the fiber optic multiplexer to the integrated optics chip in each sensor.

6. The fiber optic rotation system of claim 5 including a depolarizer placed between the second optical coupler and the integrated optics chip.

7. The fiber optic rotation sensor system of claim 5 wherein the depolarizer comprises a Lyot depolarizer arranged in the second optical fiber between the second optical coupler and the multiplexer.

8. A fiber optic rotation sensor system that includes an optically pumped gain fiber arranged to provide optical signals along an optical path to an integrated optics chip connected to a fiber optic sensing coil to introduce counter-propagating waves therein, comprising a depolarizer in the optical path for depolarizing the optical signals propagating between the gain fiber and integrated optics chip to prevent random changes in their polarization state.

9. A method for stabilizing the polarization state of light in a fiber optic rotation sensor system that includes an optically pumped gain fiber arranged to provide optical signals to a integrated optics chip connected to a fiber optic sensing coil, comprising the steps of:

arranging a first optical coupler to receive optical signals from the gain fiber;

arranging a first optical fiber to guide optical signals from the first optical coupler along an optical path toward the integrated optics chip such that optical signals from the gain fiber are input to the fiber optic sensing coil to form counter-propagating waves therein, the counter-propagating waves traversing the sensing coil and then combining in the integrated optics chip to form a gyro output signal; and depolarizing the gyro optical signals propagating between the gain fiber and the integrated optic chip.

10. The method of claim 9, wherein the step of depolarizing the optical signals comprise the step of placing a Lyot depolarizer in the first optical fiber.

11. The method of claim 10, further comprising the step of including an optical isolator in the first optical fiber arranged before the Lyot depolarizer, the optical isolator being formed to allow propagation of light in the first optical fiber from the first optical coupler to the integrated optics chip and to prevent light from propagating from the integrated optics chip to the gain fiber.

12. The method of claim 9, further comprising the step of including an optical isolator in the first optical fiber arranged after the Lyot depolarizer, the optical isolator being formed to allow propagation of light in the first optical fiber from the first optical coupler to the integrated optics chip and to prevent light from propagating from the integrated optics chip to the gain fiber.

13. The method of claim 9, further including the steps of:

connecting a second optical coupler to the first optical fiber to receive optical signals therefrom to provide an input optical signal to a plurality of interferometers;

arranging a second optical fiber to receive optical signals output from the second optical coupler for input to each of the plurality of interferometers;

arranging a third optical coupler in each of the plurality of interferometers to receive optical signals from the second optical fiber, and arranging a third optical fiber to guide optical signals from the third optical coupler to the integrated optics chip in each of the plurality of interferometers.

14. The method of claim 9 including the step of placing a depolarizer between the second optical coupler and the integrated optics chip.

15. A fiber optic rotation sensor system that includes an optically pumped gain fiber arranged to provide optical signals to an integrated optics chip connected to a fiber optic sensing coil, comprising:

a first optical coupler arranged to receive optical signals from the gain fiber;

a first optical fiber arranged to guide optical signals from the first optical coupler along an optical path toward the integrated optics chip such that optical signals from the gain fiber are input to the fiber optic sensing coil to form counter-propagating waves therein, the counter-propagating waves traversing the sensing coil and then combining in the integrated optics chip to form a gyro output signal; and means for depolarizing the optical signals propagating between the gain fiber and the integrated optics chip to prevent random changes in their polarization state.

16. The fiber optic rotation sensor system of claim 15 wherein the means for depolarizing the optical signals propagating between the gain fiber and the integrated optics chip comprises a Lyot depolarizer in the first optical fiber.

* * * * *